United States Patent
Herkommer et al.

(10) Patent No.: US 10,738,880 B2
(45) Date of Patent: Aug. 11, 2020

(54) CONTROL UNIT ARRANGEMENT FOR CONTROLLING A FLUID ARRANGEMENT

(71) Applicant: Schaeffler Technologies AG & Co. KG, Herzogenaurach (DE)

(72) Inventors: Dominik Herkommer, Schriesheim (DE); Andre Schauer, Bühl (DE); Markus Baehr, Bühl (DE); Marco Grethel, Bühlertal (DE); Jürgen Eich, Bühl (DE)

(73) Assignee: SCHAEFFLER TECHNOLOGIES AG & CO.KG, Herzogenaurach (DE)

( * ) Notice: Subject to any disclaimer, the term of this patent is extended or adjusted under 35 U.S.C. 154(b) by 226 days.

(21) Appl. No.: 15/763,810

(22) PCT Filed: Sep. 21, 2016

(86) PCT No.: PCT/DE2016/200443
§ 371 (c)(1),
(2) Date: Mar. 27, 2018

(87) PCT Pub. No.: WO2017/054816
PCT Pub. Date: Apr. 6, 2017

(65) Prior Publication Data
US 2018/0306315 A1    Oct. 25, 2018

(30) Foreign Application Priority Data
Sep. 29, 2015   (DE) .................. 10 2015 218 783

(51) Int. Cl.
*F16H 47/00* (2006.01)
*F16H 61/00* (2006.01)
*F16H 61/688* (2006.01)

(52) U.S. Cl.
CPC ..... *F16H 61/0025* (2013.01); *F16H 61/0006* (2013.01); *F16H 61/688* (2013.01)

(58) Field of Classification Search
CPC ............................. F16H 61/0025; F16H 1/688
See application file for complete search history.

(56) References Cited

U.S. PATENT DOCUMENTS 10,161,509 B2 * 12/2018  Beck ................... F16H 61/0269
2002/0002878 A1   1/2002  Petrzik
(Continued)

FOREIGN PATENT DOCUMENTS

CN      101230913 A     7/2008
CN      101323245 A    12/2008
(Continued)

OTHER PUBLICATIONS

Machine Translation of CN101230913(A) (Year: 2008).*
International Search Report for PCT/DE2016/200443; 3 pgs; dated Feb. 14, 2017 by European Patent Office.

*Primary Examiner* — Jake Cook
(74) *Attorney, Agent, or Firm* — Kevin L. Parks

(57) ABSTRACT

A control unit arrangement for controlling a fluid arrangement includes at least one transmission actuator element, at least one valve and at least one pump, for clutch and transmission activation. The control unit arrangement also includes a plurality of control units. At least one control unit of the plurality of control units is configured to actuate the at least one transmission actuator element and at least one control unit of the plurality of control units is configured to actuate the at least one pump. One of the control units from the plurality of control units is configured to actuate the at least one valve, or at least two of the control units from the plurality of control units are connected via an OR logic for a common actuation of the at least one valve.

12 Claims, 9 Drawing Sheets

(56) References Cited

U.S. PATENT DOCUMENTS

| | | | | |
|---|---|---|---|---|
| 2005/0288149 | A1* | 12/2005 | Kuhstrebe | B60K 6/547 477/97 |
| 2010/0105522 | A1* | 4/2010 | Hagelskamp | F16H 61/0206 477/138 |
| 2011/0303049 | A1 | 12/2011 | Neelakantan et al. | |
| 2017/0045098 | A1* | 2/2017 | Novak | F16H 61/0021 |
| 2017/0045139 | A1* | 2/2017 | Novak | F16H 61/688 |

FOREIGN PATENT DOCUMENTS

| | | |
|---|---|---|
| CN | 101743413 A | 6/2010 |
| CN | 102278463 B | 12/2011 |
| CN | 102345734 A | 2/2012 |
| CN | 102537306 A | 7/2012 |
| CN | 102762898 A | 10/2012 |
| DE | 19630155 A1 | 1/1998 |
| DE | 102010042262 A1 | 4/2012 |
| EP | 1150040 A2 | 10/2001 |
| FR | 3010374 A1 | 3/2015 |
| WO | 2015090317 A1 | 6/2015 |

\* cited by examiner

CONTROL UNIT ARRANGEMENT FOR CONTROLLING A FLUID ARRANGEMENT

CROSS-REFERENCE TO RELATED APPLICATIONS

This application is the U.S. National Phase of PCT Appln. No. PCT/DE2016/200443 filed Sep. 21, 2016, which claims priority to DE 10 2015 218 783.7 filed Sep. 29, 2015, the entire disclosures of which are incorporated by reference herein.

TECHNICAL FIELD

The present disclosure relates to a control unit arrangement for controlling a fluid arrangement, having at least one transmission actuator element, at least one valve and at least one pump, for clutch and transmission activation.

BACKGROUND

A corresponding fluid arrangement for clutch and transmission activation is known, for example, from WO 2015/090317 A1. This fluid arrangement comprises on the transmission side transmission actuators which are embodied as hydraulic slave cylinders, and valves which are connected thereto. Each of the transmission actuators is actuated by means of one of the valves. On the clutch side the fluid arrangement comprises at least one hydraulic clutch actuator. A central region of the fluid arrangement comprises a fluid pump which is connected to the transmission-side valves via a first line, and to the hydraulic clutch actuator via a second line. In other words, the fluid pump can serve as a volume flow source both for the transmission side and for the clutch side. The actuators, the valves and the pump are configured here in such a way that they can be actuated, wherein the actuation generally takes place by means of control units. Control units for actuation of each individual component of these components are known.

SUMMARY

The object of the present disclosure is to specify an effective control unit arrangement for controlling the components of the fluid arrangement which can be actuated. In this context, the connection of the control means of the valves is of particular interest.

The control unit arrangement for controlling the fluid arrangement, having at least one transmission actuator element, at least one valve and at least one pump, for clutch and transmission activation, has according to the present disclosure (i) a central control unit or (ii) a group of control units, at least one control unit of which is configured to actuate the at least one transmission actuator element and at least one control unit of which is configured to actuate the at least one pump. In this context, (a) the central control unit or one of the control units from the group of control units is configured to actuate the at least one valve, or (b) a plurality of the control units from the group of control units are connected via an OR logic for the common actuation of the at least one valve. Transmission actuator elements are to be understood as being, inter alfa, also transmission actuators, in particular hydraulic transmission actuators.

A fluid arrangement which is to be controlled by means of the control unit arrangement, for clutch and transmission activation is, as already mentioned, known. This fluid arrangement requires, for clutch and transmission activation, coordinated actuation of the components comprising the transmission actuator element/elements, valve/valves and pump/pumps. The fluid arrangement is preferably a hydraulic arrangement.

In some embodiments centralized control via a single central control unit is advantageous, and in other embodiments it is advantageous to include local control units by means of a control unit hierarchy. Decentralized control is also advantageous for some applications.

According to one advantageous embodiment of the present disclosure there is provision that at least one of the control units from the group of control units is configured to actuate the at least one transmission actuator element, and at least one further control unit of the control units from the group of control units is configured to actuate the at least one pump.

According to one advantageous embodiment of the present disclosure there is provision that one of the control units from the group of control units is embodied as a superordinate control unit, and at least one other of the control units is embodied as a control unit which is hierarchically subordinate to this superordinate control unit.

In this context, there is provision, in particular that the control unit arrangement is configured in such a way that one of the subordinate control units assumes, where necessary, in particular in the case of a defect in the superordinate control unit, the entire function or at least parts of the function of the superordinate control unit.

According to one preferred refinement of the present disclosure there is provision that the control unit arrangement has a plurality of subordinate control units, wherein at least one of the subordinate control units is provided for the at least one transmission actuator element, and at least one other of the subordinate control units is provided for the at least one pump.

According to a further preferred refinement of the present disclosure, a plurality of subordinate control units are provided for pumps.

According to yet a further preferred refinement of the present disclosure, the control unit arrangement has at least one interface for connecting to a motor vehicle bus system.

In this context there is provision, in particular, that the interface, or at least one of the interfaces, is designed to connect to a motor vehicle bus system on the central control unit or on the superordinate control unit.

In one preferred refinement of the present disclosure there is provision that the superordinate control unit is configured to directly actuate the at least one valve and/or to indirectly actuate the at least one valve via a subordinate control unit.

The control unit arrangement advantageously has a separate BUS system via which the control units communicate with one another.

In a further preferred refinement of the present disclosure there is finally provision that the control unit arrangement has a decentralized arrangement of the control units of the group of control units.

The present disclosure also relates to the use of the above-mentioned control unit arrangement for controlling a fluid arrangement, having at least one transmission actuator element, at least one valve and at least one pump, for clutch and transmission activation.

BRIEF DESCRIPTION OF THE DRAWINGS

The present disclosure will be explained by way of example below with reference to the appended drawings and using preferred exemplary embodiments, wherein the features presented below can constitute an aspect of the present disclosure both respectively individually and in combination. In the drawings.

DETAILED DESCRIPTION

Figure 1:
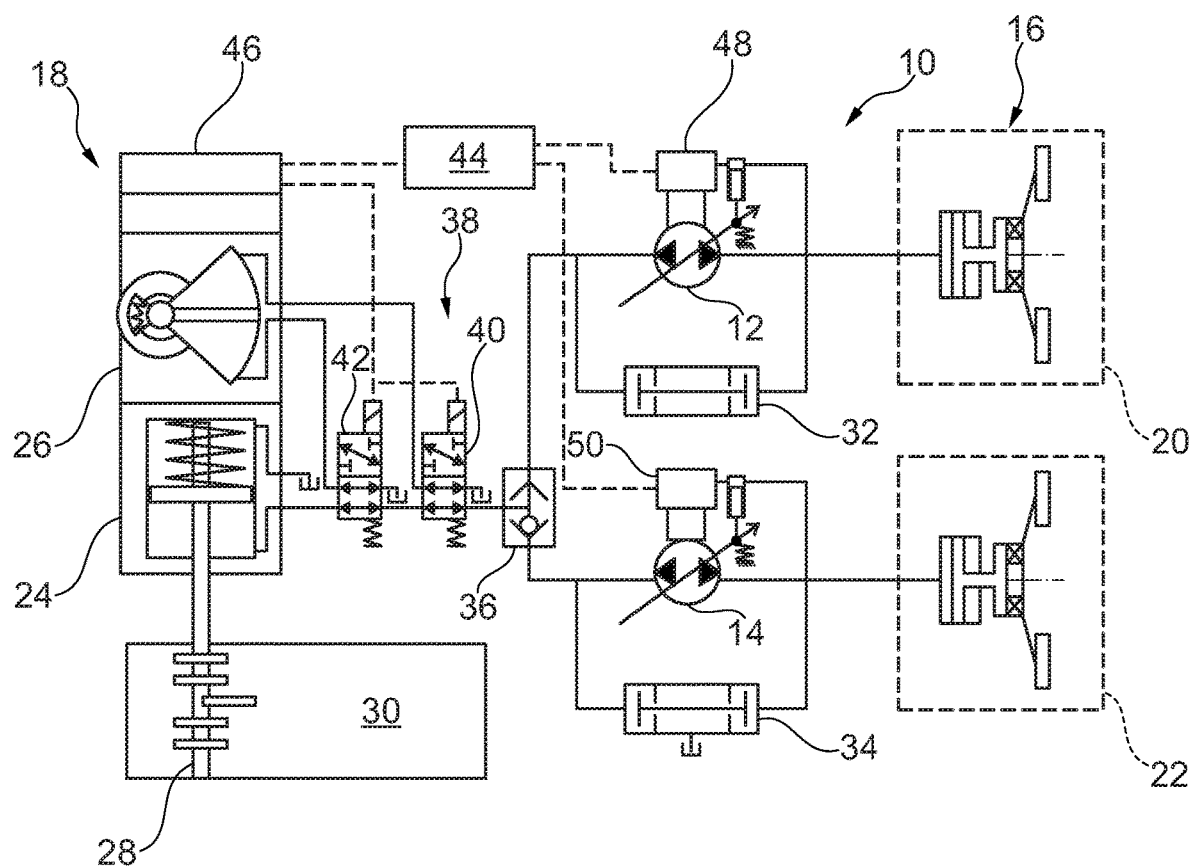
FIG. 1 shows a fluid arrangement, to be controlled, for clutch and transmission activation as well as corresponding control units of a control unit arrangement.

FIG. 1 shows a fluid arrangement 10, to be controlled, for clutch and transmission activation in a circuit-diagram-like illustration.

The fluid arrangement 10 comprises a first pump 12 and a second pump 14. The pumps 12, 14 are fluid pumps, which can also be referred to as reversing pump actuators and which, as indicated by arrow symbols, can be operated in opposite feed directions. The pumps 12, 14 permit, in a particularly advantageous way, activation of a double clutch 16 and of a transmission actuator element 18.

The double clutch 16 comprises a first partial clutch 20 and a second partial clutch 22. The first partial clutch 20 of the double clutch 16 can be activated by means of the first (reversing) pump 12. The second partial clutch 22 of the double clutch 16 can be activated by means of the second (reversing) pump 14.

The transmission actuator element 18 is embodied as a transmission actuator device which comprises a first transmission actuator 24 and a second transmission actuator 26. Alternatively, the transmission actuator element 18 can also comprise transmission activation with switching rails. The first transmission actuator 24 serves to provide a selector function of the transmission 30, and is therefore also referred to as a selector actuator. The second transmission actuator 26 preferably serves to provide a switching function of the transmission 30, and is therefore also referred to as a switching actuator. The switching actuator 26 is embodied here as a pivoting actuator. A selector shaft 28 extends from the transmission actuator element 18 into the (multi-speed) transmission 30. The two pumps 12, 14 are each assigned an AND valve 32, 34.

The respective AND valve 32, 34 is also referred to as a two-pressure valve and has two connections, with which the AND valve 32, 34 is connected to the respective connections of the assigned pump 12, 14. The respective AND valve 32, 34 comprises a (fluid) reservoir connection as a third connection.

The AND valve 32, 34 or two-pressure valve easily permits transmission functions which are different independently of the rotational direction to be provided with the (reversing) pumps 12, 14. The transmission actuator element 18 is coupled to the two pumps 12, 14 via an OR valve 36. This provides, inter alia, the advantage that the pump 12, 14 which is currently not engaged with the activation of its assigned clutch 20, 22 can supply one of the transmission actuators 24, 26 with a feed current and a feed pressure.

A valve arrangement 38 with two valves 40, 42 which can be actuated and which are embodied as proportional directional control valves is connected between the OR valve 36 and the transmission actuator element 18. The two valves 40, 42 are embodied, for example, as 4/3-way directional control valves and are activated electromagnetically. The two proportional directional control valves 40, 42 are prestressed into their illustrated switched positions by means of a spring arrangement (illustrated symbolically).

In addition to the fluid arrangement 10 to be controlled, FIG. 1 shows an exemplary arrangement and signal-conducting connection of a group of control units 44, 46, 48, 50. A first of the control units is embodied as a superordinate control unit (master control unit—ECU) 44. This superordinate control unit 44 has a signal-conducting connection to each other control unit (HCU, LCU) 46, 48, 50 of the group of control units. The signal-conducting connections are illustrated as dashed lines in the figures. The other control units 46, 48, 50 are assigned to the following components of the fluid arrangement 10:

The control unit 46 is a control unit (HCU) for the transmission actuator element 18, that is to say for the transmission actuators 24, 26. The control unit 48 is a control unit (LCU) for the first pump 12, and the control unit 50 is a control unit (LCU) for the second pump 14.

The embodiments of a control unit arrangement 52 which are proposed in the following FIGS. 2-18 can be used both for the fluid arrangement 10 which is shown in FIG. 1 and embodied as a hydraulic arrangement, as well for other hydraulic connections of the pumps 12, 14 of the transmission 30 and of the clutches 20, 22.

Figure 2:
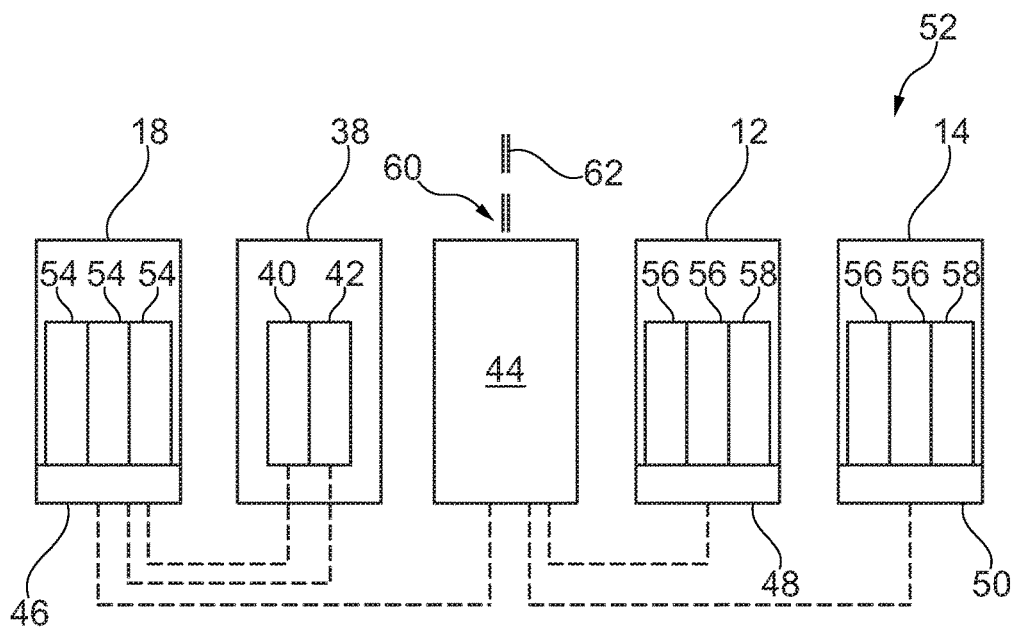
FIG. 2 shows a schematic illustration of the control unit arrangement for controlling the fluid arrangement shown in FIG. 1, according to a first embodiment according to the present disclosure.

FIG. 2 shows the control unit architecture of the control unit arrangement 10 such as is also implemented in FIG. 1. The central intelligence is seated in the superordinate control unit (of the ECU) 44 which performs the actuation of the subordinate control units (HCU and LCUs) 46, 48, 50. The valves are actuated from the HCU (HGA control unit) 46.

The following components are integrated into the actuation by means of the control unit arrangement 52: sensors (travel sensor, angle sensor) 54 in the transmission actuator element 18 and sensors (angle sensor, pressure sensor) 56 as well as motors 58 in the pumps 12, 14. The superordinate control unit (master control unit ECU) 44 has an interface 60 for connecting to a motor vehicle bus system 62.

Figure 3:
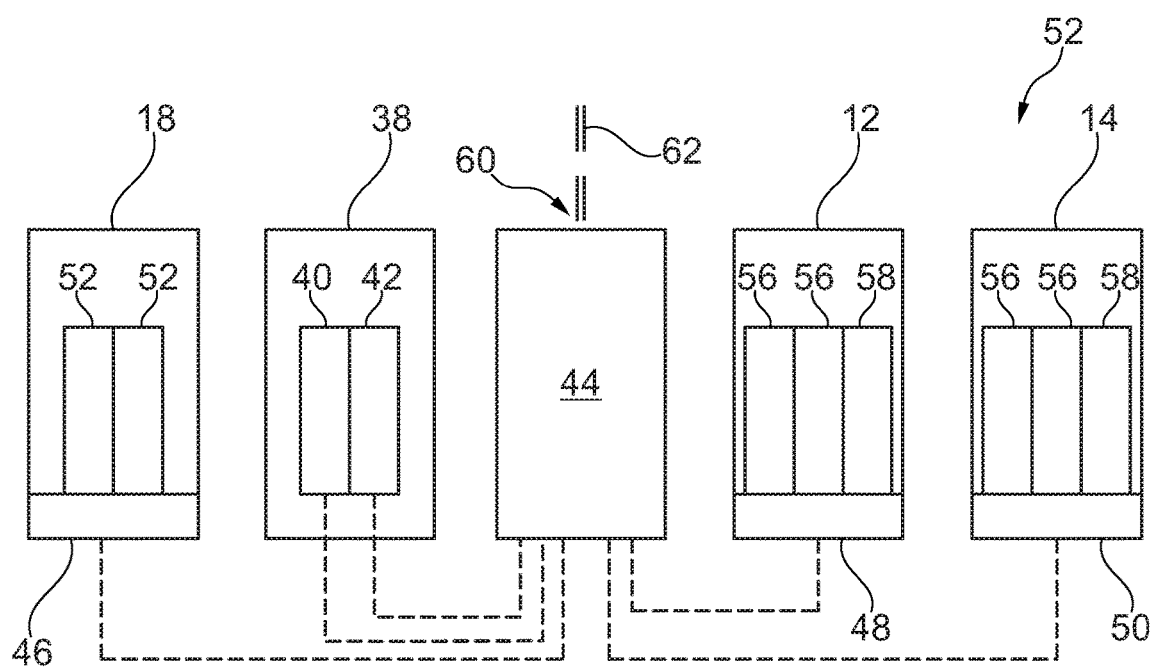
FIG. 3 shows the schematic illustration of a control unit arrangement according to a second embodiment according to the present disclosure.

FIG. 3 shows an alternative control unit arrangement 10 in which the valve control is performed by the superordinate control unit (of the ECU) 44.

Figure 4:
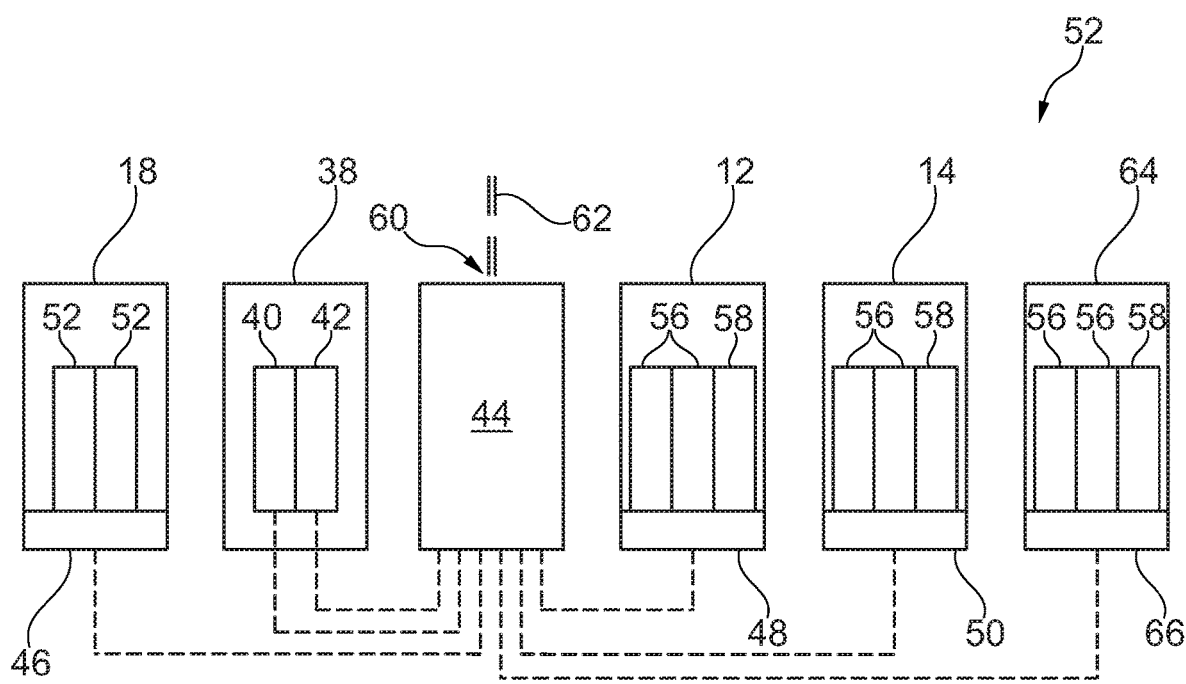
FIG. 4 shows the schematic illustration of a control unit arrangement according to a third embodiment according to the present disclosure.

FIG. 4 shows the control unit arrangement 10 with 3 actuator components, the two pumps 12, 14 and a third component 64, for example for K0. The latter is then assigned a dedicated subordinate control unit (LCU) 66.

Figure 5:
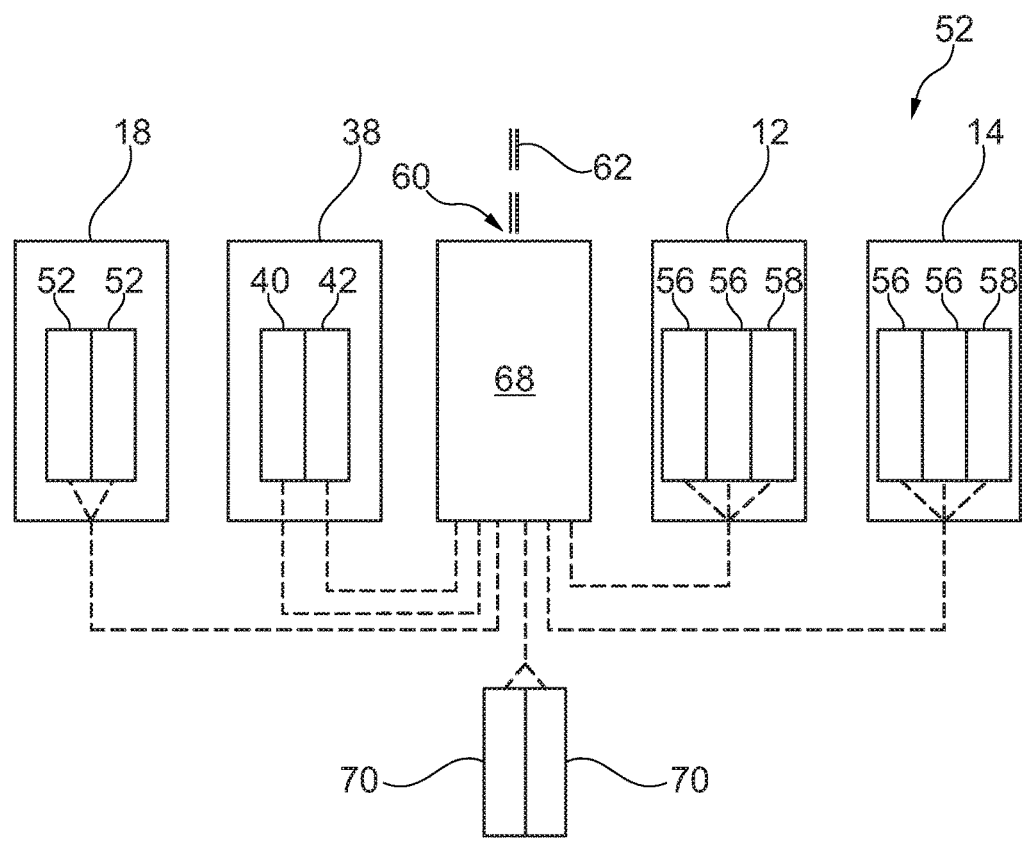
FIG. 5 shows the schematic illustration of a control unit arrangement according to a fourth embodiment according to the present disclosure.

FIG. 5 shows a completely centralized variant of the control unit arrangement 10 in which all the intelligence is concentrated exclusively in a central control unit (of a TCU) 68. There are no local control units here. The central control unit 68 can also read out/actuate further components 70, for example read out CSC travel sensors.

Figure 6:
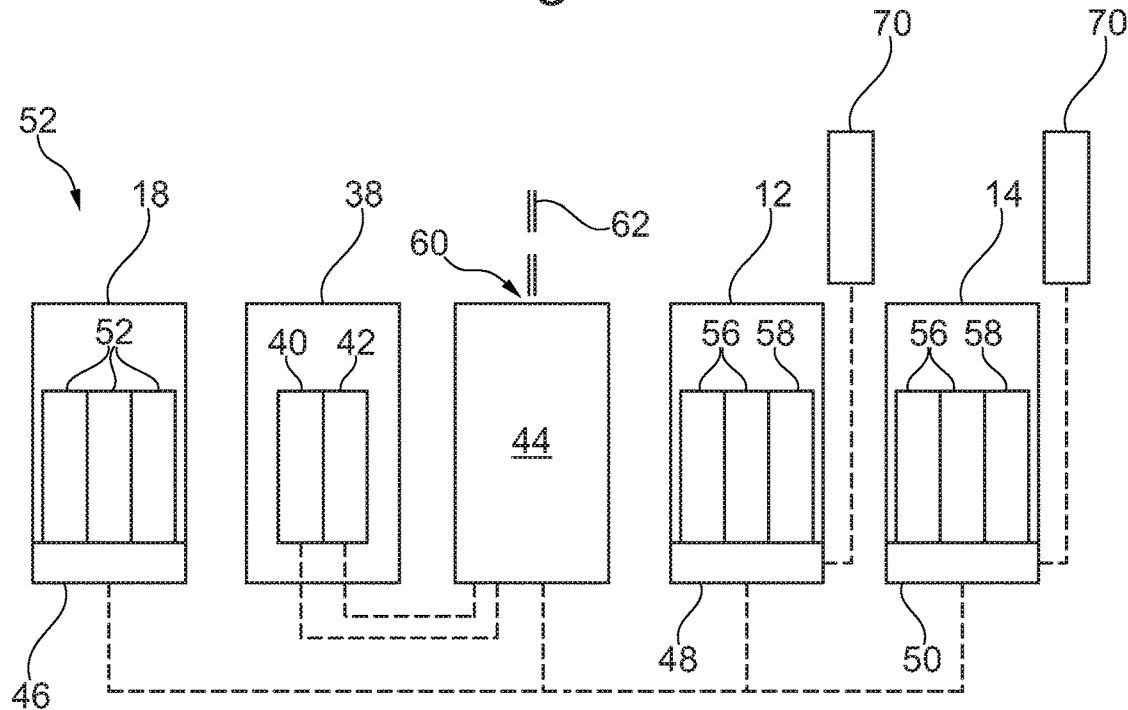
FIG. 6 shows the schematic illustration of a control unit arrangement according to a fifth embodiment according to the present disclosure.

FIG. 6 shows a variant with central intelligence in the ECU 44 and a communication process between the individual control units 44, 46, 48, 50 via a dedicated BUS of the control unit arrangement 52. Important sensor signals (for example positions or angles from the transmission to the actuators) can be exchanged via this private BUS. Likewise functional reliability functions can also be integrated. In addition, CSC travel sensors 70 are integrated here, the latter being respectively connected to the LCU 48, 50 of the pump 12, 14 which is also assigned functionally. The sensors of the HGA (transmission) 18 comprise here: travel sensor 52, angle sensor 52, pressure sensor 52.

Figure 7:
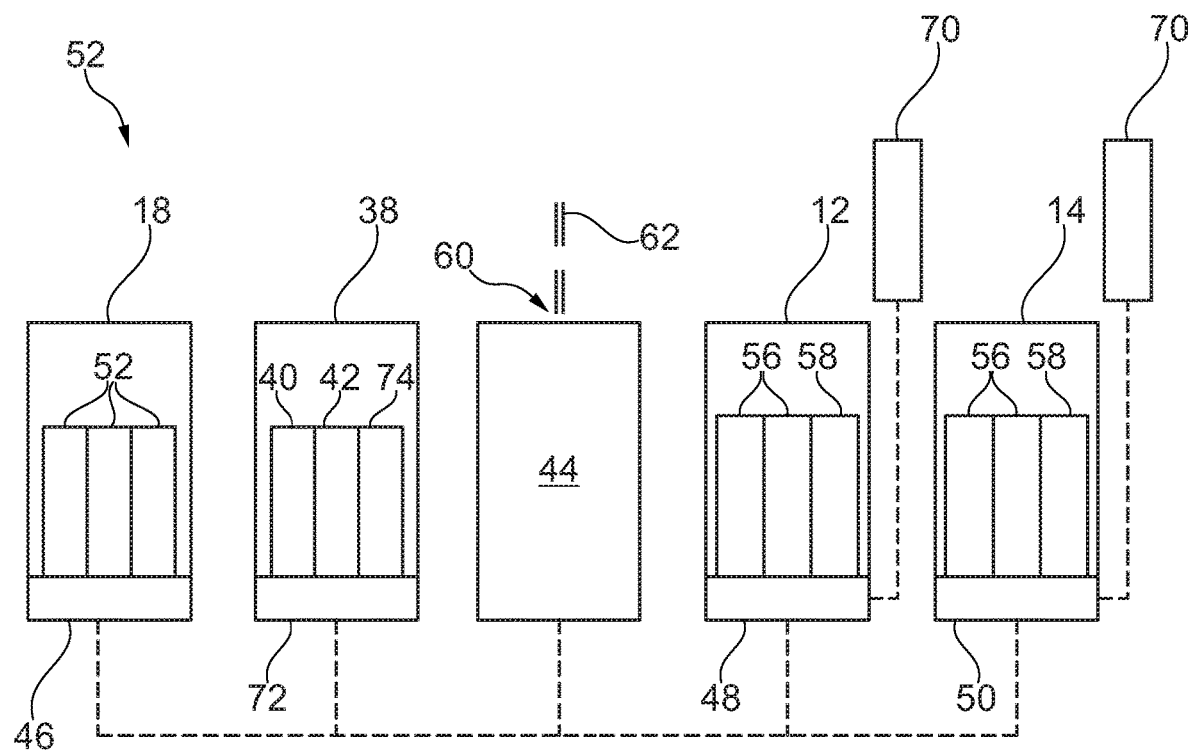
FIG. 7 shows the schematic illustration of a control unit arrangement according to a sixth embodiment according to the present disclosure.

The control unit arrangement 52 in FIG. 7 differs from the previous control unit arrangements 52 in that the valve arrangement 38 is assigned a dedicated control unit 72 (and optionally sensor system).

Figure 8:
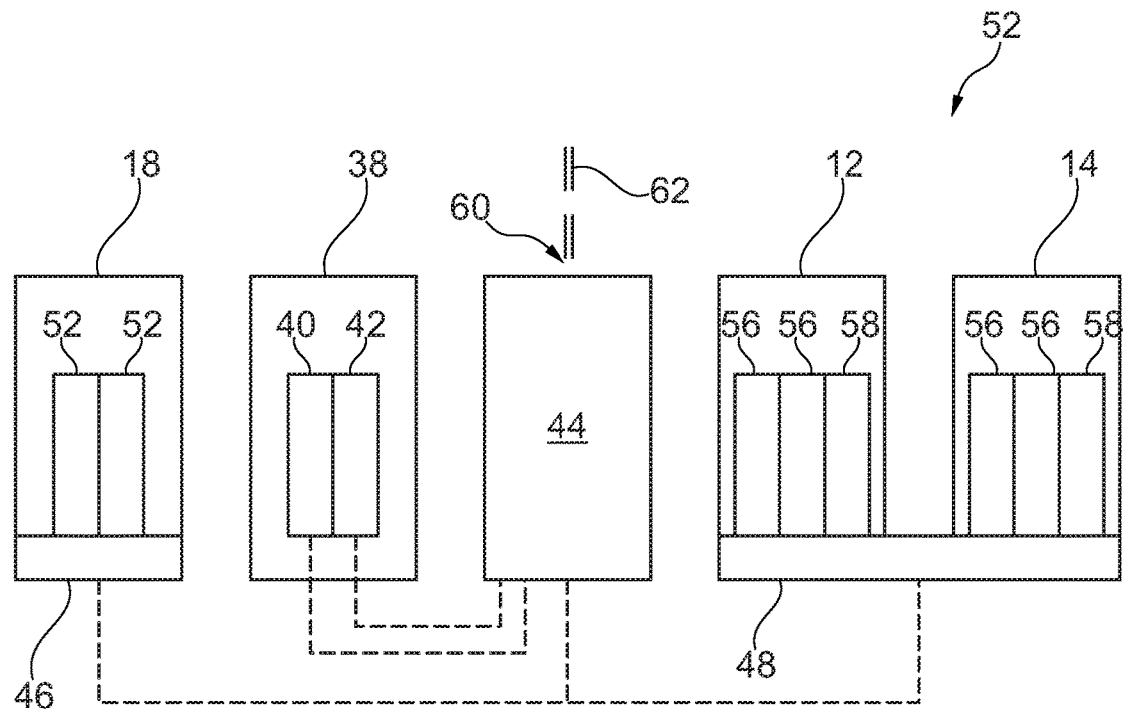
FIG. 8 shows the schematic illustration of a control unit arrangement according to a seventh embodiment according to the present disclosure.

FIG. 8 shows the possibility of managing the two pumps (EPAs) 12, 14 with a common control unit 48. This has the advantage that fewer control units are required.

Figure 9:
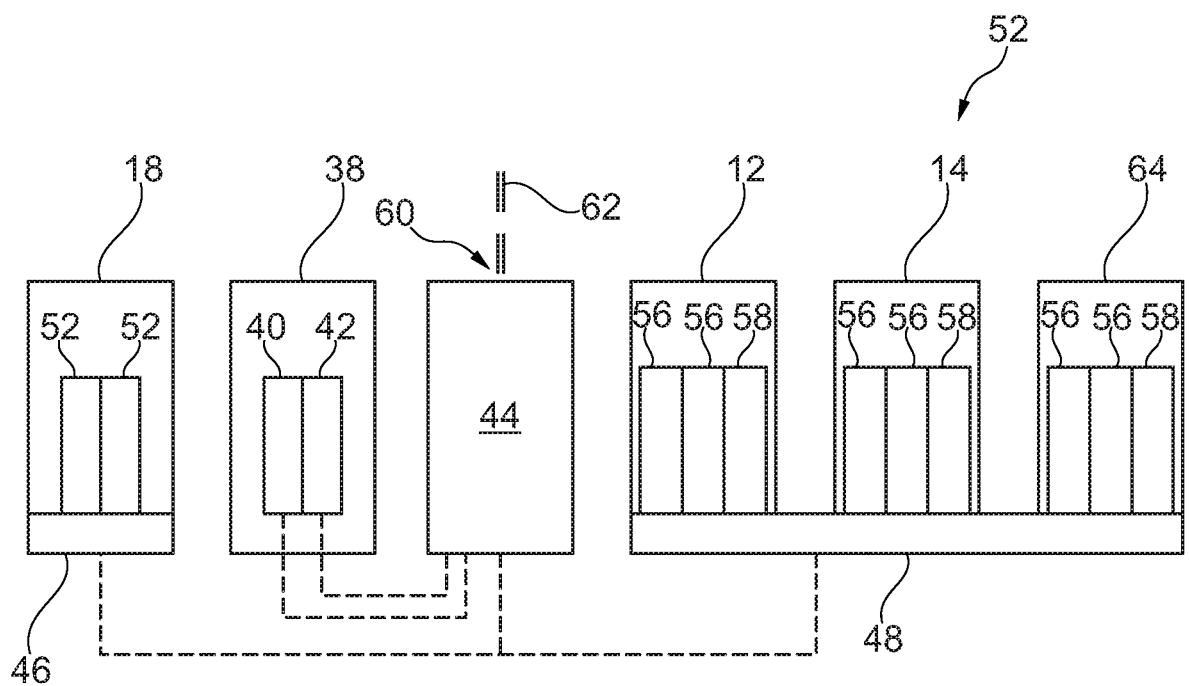
FIG. 9 shows the schematic illustration of a control unit arrangement according to an eighth embodiment according to the present disclosure.

FIG. 9 shows an analog arrangement 52 for fluid arrangements with three pumps 12, 14, 64, for example for a separating clutch K0.

Figure 10:
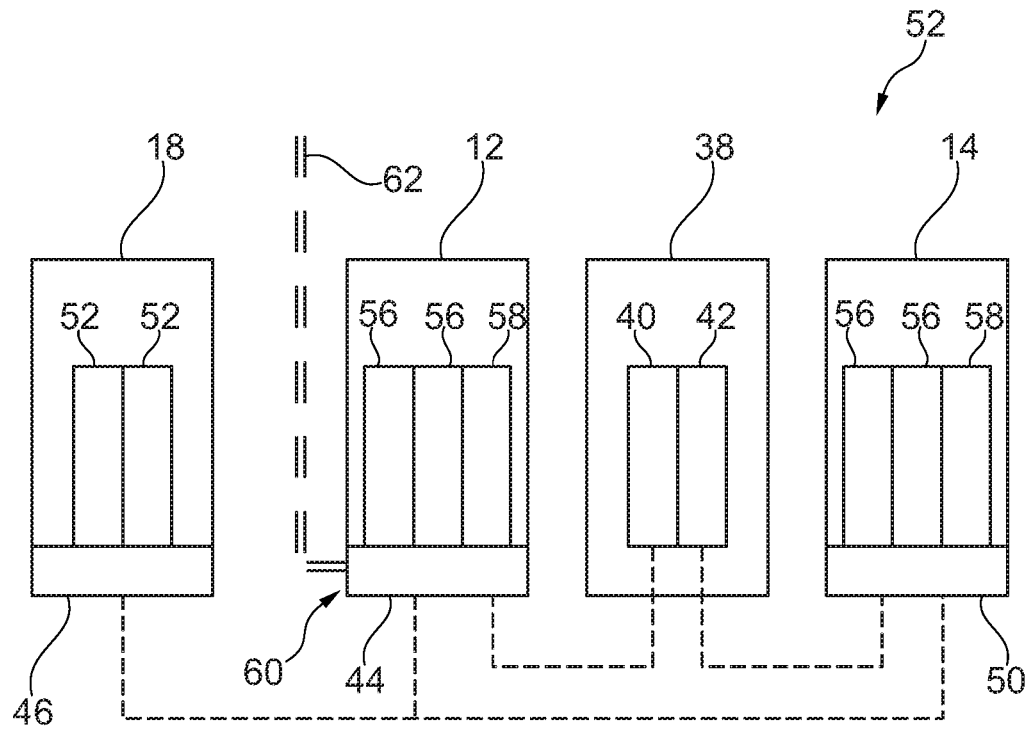
FIG. 10 shows the schematic illustration of a control unit arrangement according to a ninth embodiment according to the present disclosure.

FIG. 10 shows a control unit arrangement 52 in which one of the two LCUs is the master control unit 44 which carries out the communication with the vehicle bus 62 via the interface 60.

Figure 11:
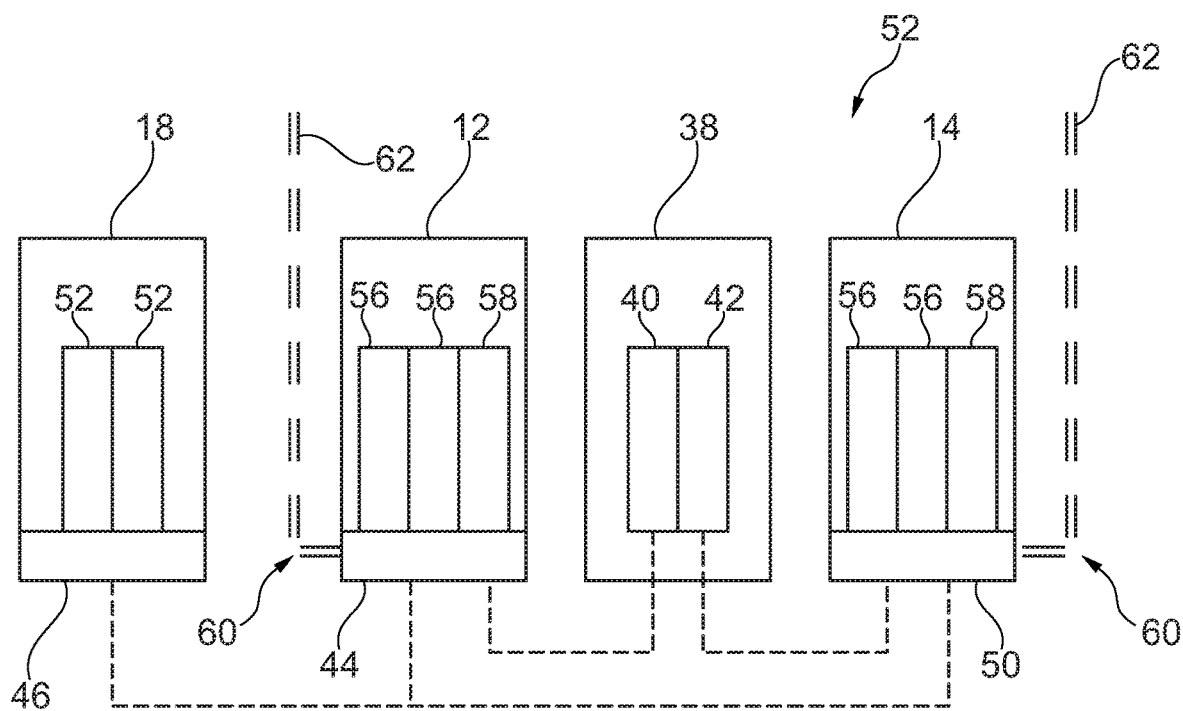
FIG. 11 shows the schematic illustration of a control unit arrangement according to a tenth embodiment according to the present disclosure.

FIG. 11 is in principle identical to the preceding figure. However, both actuator LCUs 48, 50 are provided here with an interface 60 with the result that in the case of a fault in the other LCU 48, 50 the normally subordinate LCU 50, 48 can carry out the control of the system.

Figure 12:
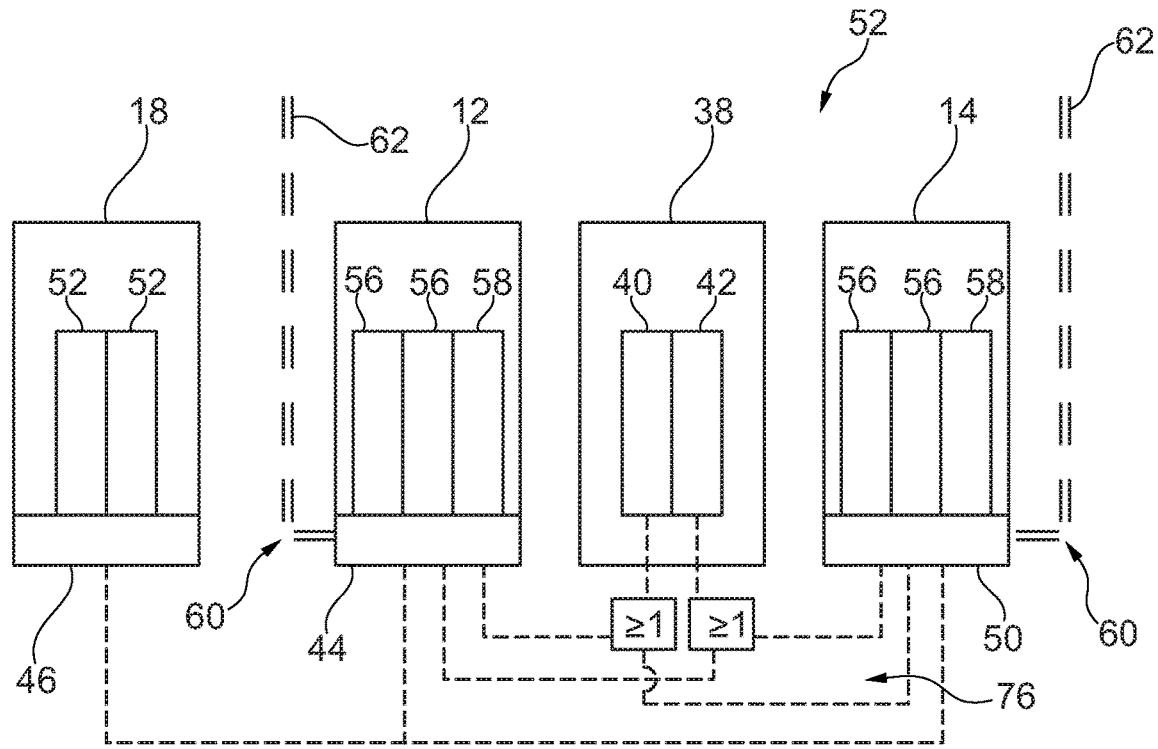
FIG. 12 shows the schematic illustration of a control unit arrangement according to an eleventh embodiment according to the present disclosure.

FIG. 12 shows a similar arrangement. However, here not every LCU 48, 50 is assigned a valve 40, 42 but rather each LCU 48, 50 can activate each valve 40, 42. This is done by means of an OR logic 76. The valve output stages can be located upstream or downstream of the OR logic here.

Figure 13:
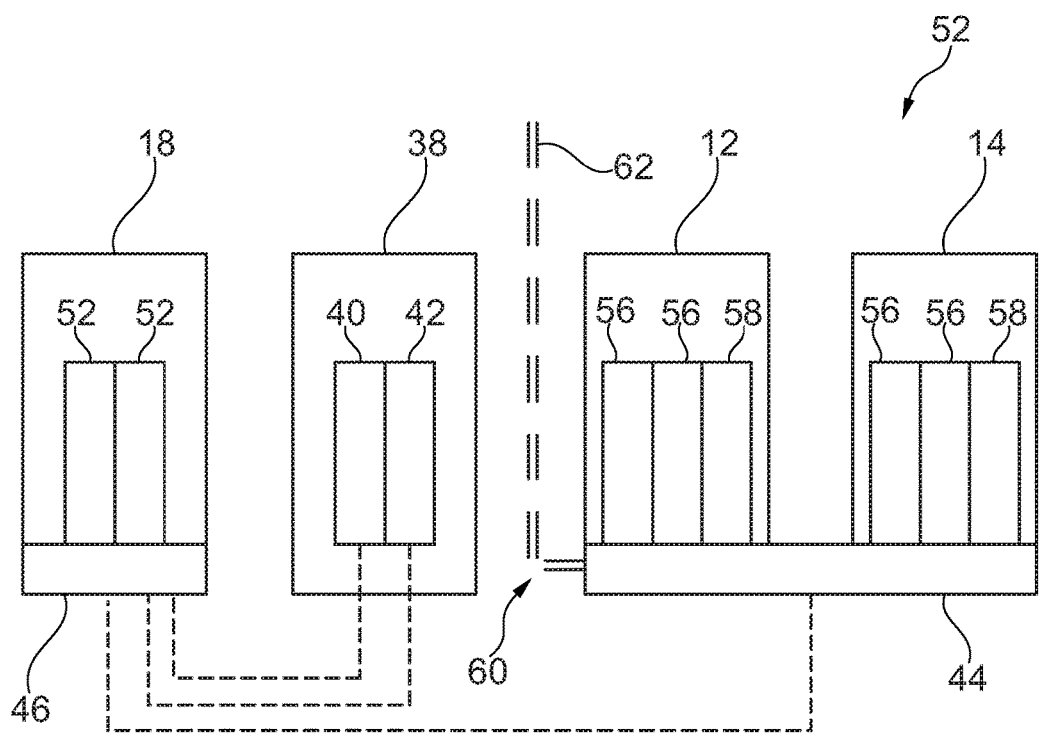
FIG. 13 shows the schematic illustration of a control unit arrangement according to a twelfth embodiment according to the present disclosure.

In the control unit arrangement in FIG. 13, a common control unit (LCU) of the two pumps 12, 14 is the superordinate control unit (master control unit) 44.

Figure 14:
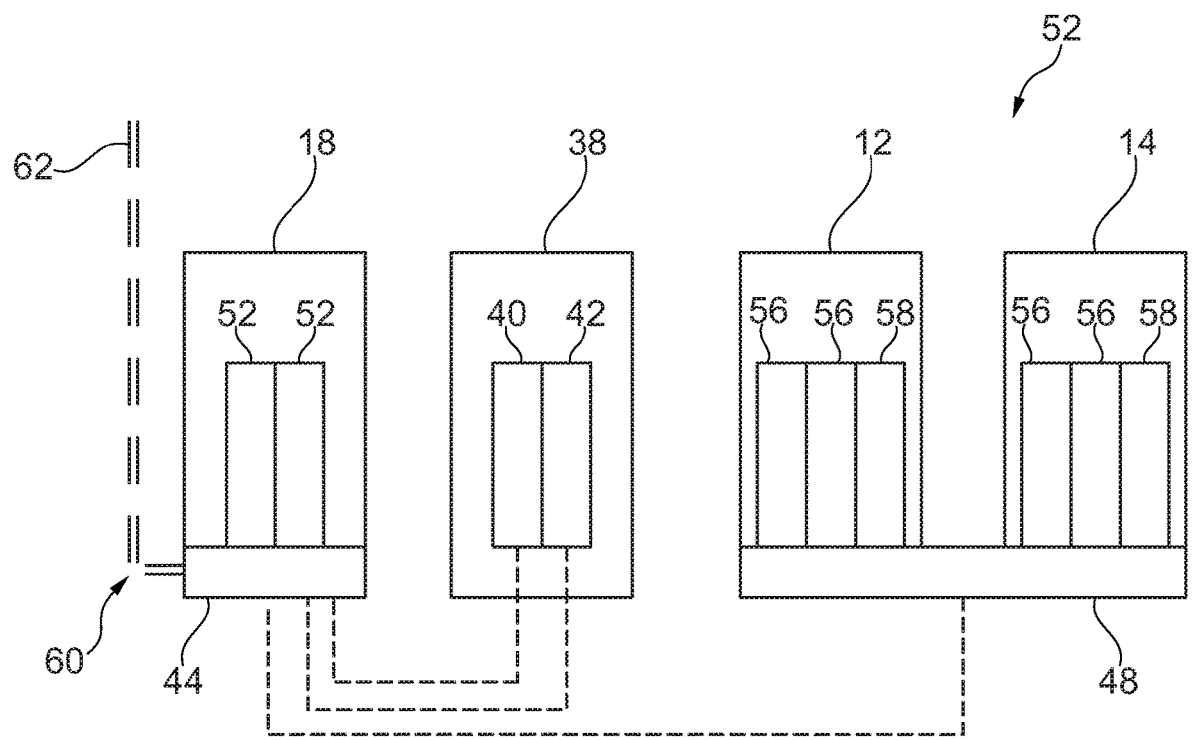
FIG. 14 shows the schematic illustration of a control unit arrangement according to a thirteenth embodiment according to the present disclosure.

In the control unit arrangement 52 shown in FIG. 14, the transmission control unit is the master control unit 44.

Figure 15:
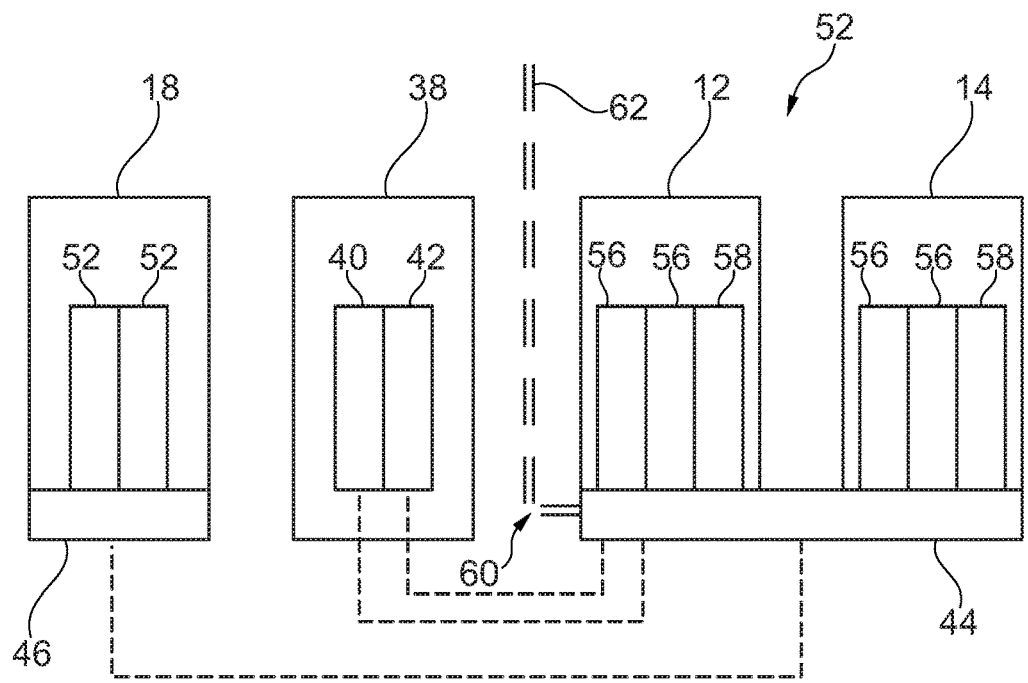
FIG. 15 shows the schematic illustration of a control unit arrangement according to a fourteenth embodiment according to the present disclosure.

FIG. 15: In this control unit arrangement 52 the common LCU is provided as a master control unit 44 including the valve actuation means of the valves 42, 44.

Figure 16:
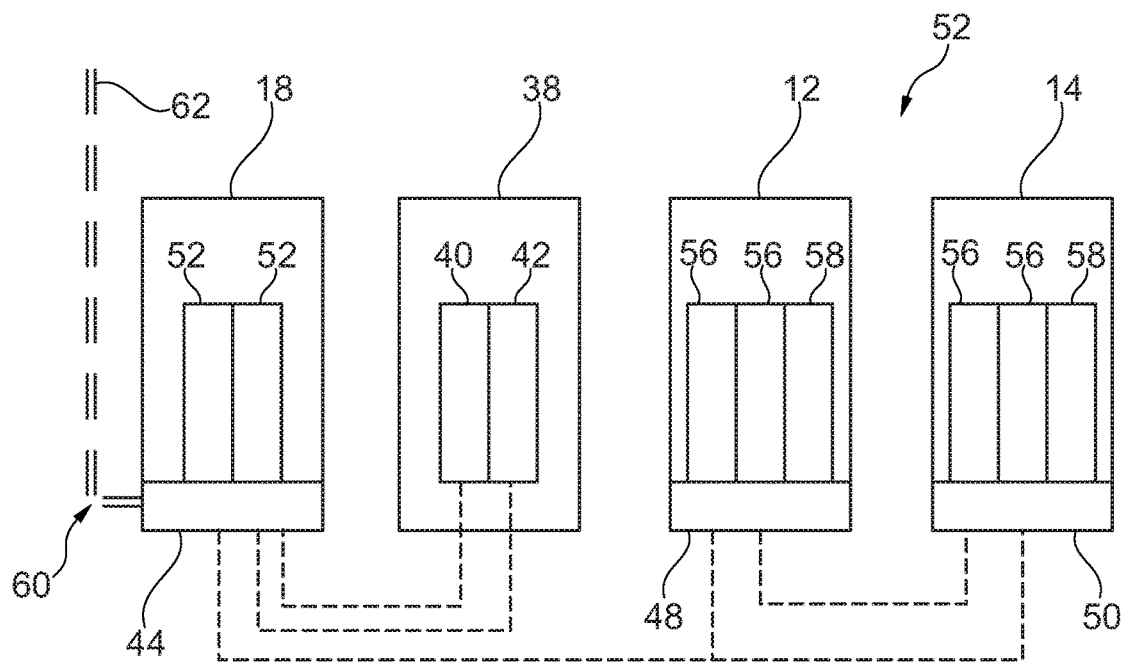
FIG. 16 shows the schematic illustration of a control unit arrangement according to a fifteenth embodiment according to the present disclosure.

FIG. 16: In this control unit arrangement 52 the transmission control unit is the master control unit 44 and it includes the valve control means. Between the pump LCUs 48, 50 there is direct communication, which can be used as a Watchdog function.

Figure 17:
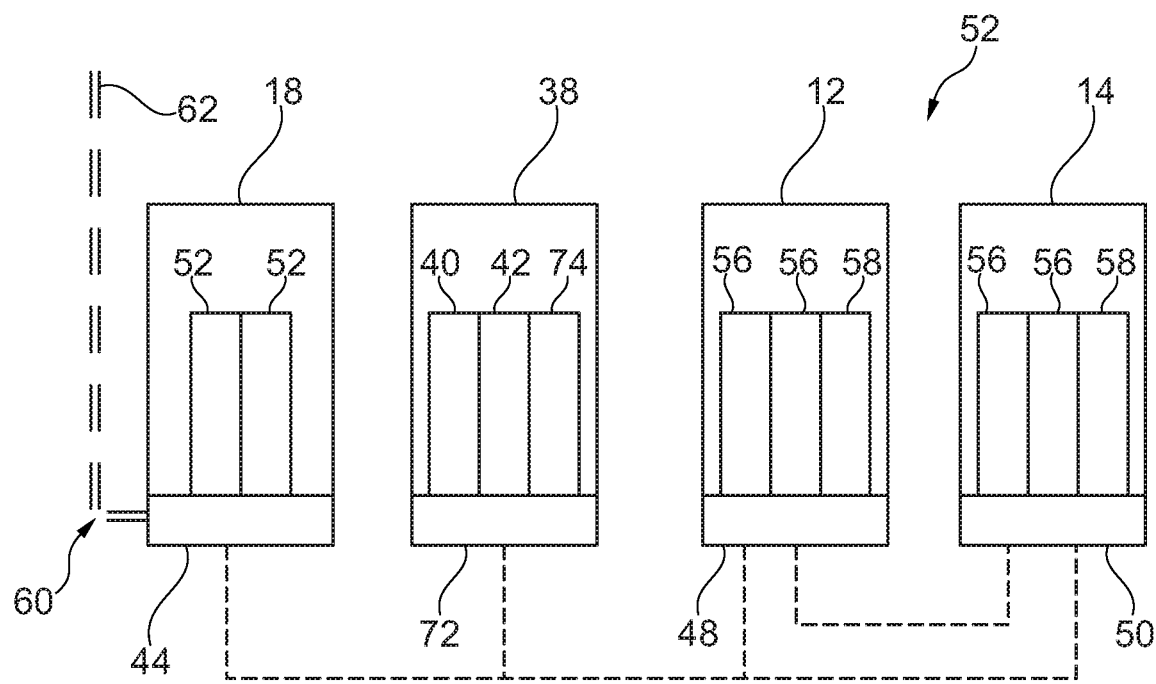
FIG. 17 shows the schematic illustration of a control unit arrangement according to a sixteenth embodiment according to the present disclosure.

FIG. 17 also shows a control unit arrangement 52 in which the valve arrangement 38 is provided with a dedicated control unit 72 and a dedicated sensor system.

Figure 18:
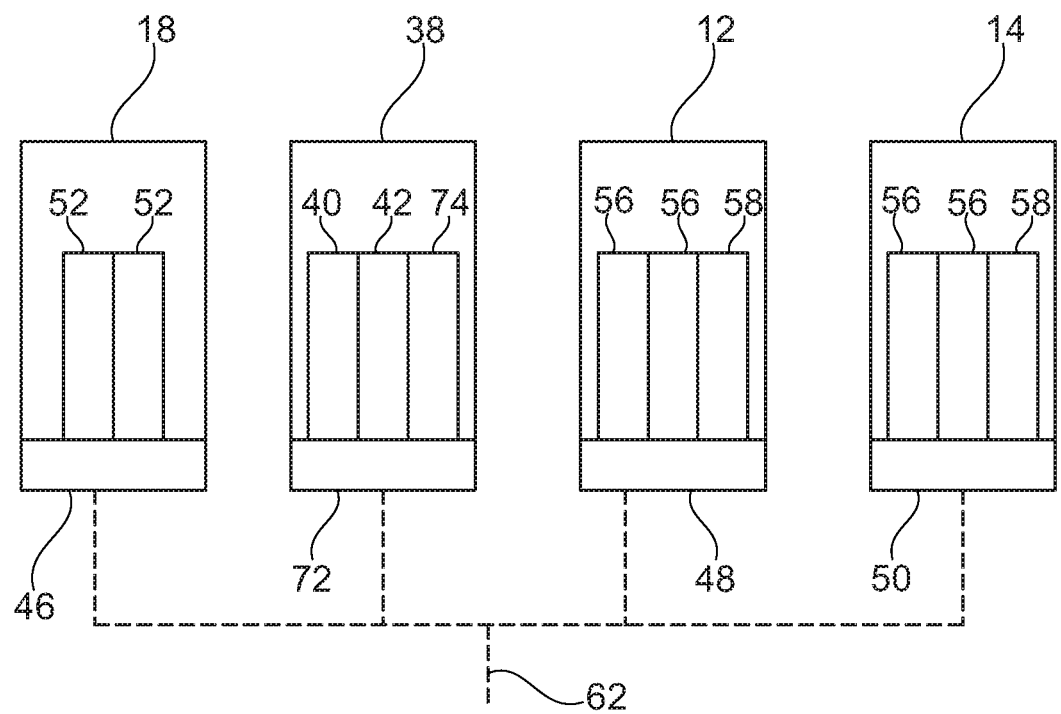
FIG. 18 shows the schematic illustration of a control unit arrangement according to a seventeenth embodiment according to the present disclosure.

FIG. 18 finally shows a completely decentralized control unit arrangement 52 in which all the control units 46, 48, 50, 72 are connected in an equivalent fashion to the vehicle interface or the vehicle BUS 62.

LIST OF REFERENCE NUMBERS

10 Fluid arrangement
12 Pump
14 Pump
16 Double clutch
18 Transmission actuator element
20 Partial clutch, second
22 Partial clutch, first
24 Transmission actuator, first
26 Transmission actuator, second
28 Selector shaft
30 Transmission
32 AND valve
34 AND valve
36 OR valve
38 Valve arrangement
40 Valve
42 Valve
44 Control unit, superordinate
46 Control unit, subordinate
48 Control unit, subordinate
50 Control unit, subordinate
52 Control unit arrangement
54 Sensor
56 Sensor
58 Motor
60 Interface
62 Bus
64 Component, further
66 Control unit, subordinate
68 Control unit, central
70 Sensor, other
72 Control unit, subordinate
74 Sensor
76 OR logic

The invention claimed is:

1. A control unit arrangement for controlling a fluid arrangement, having at least one transmission actuator element, at least one valve and at least one pump, for clutch and transmission activation, the control unit arrangement comprising:
    a superordinate control units;
    a first subordinate control unit, hierarchically subordinate to the superordinate control unit, configured to actuate the at least one transmission actuator element; and a second subordinate control unit, hierarchically subordinate to the superordinate control unit, configured to actuate the at least one pump, wherein the superordinate control unit, the first subordinate control unit, the second subordinate control unit, or a third subordinate control unit, hierarchically subordinate to the superordinate control unit is configured to actuate the at least one valve.

2. The control unit arrangement as claimed in claim 1, wherein the control unit arrangement is configured in such a way that the first subordinate control unit, the second subordinate control unit, or the third subordinate control unit assumes, in response to a defect in the superordinate control unit, the entire function of the superordinate control unit.

3. The control unit arrangement as claimed in claim 1, wherein the second subordinate control unit comprises a first second subordinate control unit and a second second subordinate control unit.

4. The control unit arrangement as claimed in claim 1, further comprising at least one interface for connecting to a motor vehicle bus system.

5. The control unit arrangement as claimed in claim 4, wherein the interface is configured to connect to the motor vehicle bus system on a central control unit or on the superordinate control unit.

6. The control unit arrangement as claimed in claim 1, wherein the superordinate control unit is configured to directly actuate the at least one valve or to indirectly actuate the at least one valve via the first subordinate control unit, the second subordinate control unit, or the third subordinate control unit.

7. The control unit arrangement as claimed in claim 1, wherein the plurality of superordinate control unit, the first subordinate control unit and the second subordinate control units are connected to a vehicle interface or a vehicle bus such that a decentralized control unit arrangement is formed.

8. A fluid arrangement for clutch and transmission activation in a vehicle, comprising:
a double clutch including a first partial clutch and a second partial clutch;
a first pump and a second pump operable in opposite feed directions, wherein the first partial clutch of the double clutch is configured to be activated by the first pump and the second partial clutch of the double clutch is configured to be activated by the second pump;
a transmission actuator element including a first transmission actuator and a second transmission actuator, wherein the first transmission actuator is configured to provide a selector function of the transmission and the second transmission actuator is configured to provide a switching function of the transmission; and
a plurality of control units, wherein one control unit of the plurality of control units is a superordinate control unit and the other control units are subordinate control units, wherein the superordinate control unit performs the actuation of the subordinate control units.

9. The fluid arrangement of claim 8, wherein the transmission actuator element is coupled to the first pump and the second pump via an OR valve.

10. The fluid arrangement of claim 9, further comprising a valve arrangement having a first valve and a second valve connected between the OR valve and the transmission actuator element.

11. The fluid arrangement of claim 9, wherein at least one of the subordinate control units controls the transmission actuator element, the first pump, or the second pump.

12. The fluid arrangement of claim 8, wherein the superordinate control unit has a signal-conducting connection to each of the subordinate control units.

* * * * *